(12) United States Patent
Maeng et al.

(10) Patent No.: US 11,010,003 B2
(45) Date of Patent: May 18, 2021

(54) TOUCH SENSOR MODULE, WINDOW STACK STRUCTURE INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Chang Jun Maeng, Gyeonggi-do (KR); Heon Kim, Gyeonggi-do (KR); Hyun Min Shin, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 16/731,348

(22) Filed: Dec. 31, 2019

(65) Prior Publication Data

US 2020/0218399 A1    Jul. 9, 2020

(30) Foreign Application Priority Data

Jan. 3, 2019   (KR) .......................... 10-2019-0000839

(51) Int. Cl.
*G06F 3/044*   (2006.01)
*G02F 1/1335*  (2006.01)
*G06F 3/041*   (2006.01)

(52) U.S. Cl.
CPC ...... *G06F 3/0443* (2019.05); *G02F 1/133528* (2013.01); *G06F 3/0412* (2013.01)

(58) Field of Classification Search
CPC ...... G06F 3/0412; G06F 3/044; G06F 3/0446; G06F 3/0416; G06F 2203/04103
See application file for complete search history.

(56) References Cited

U.S. PATENT DOCUMENTS

| 2002/0167725 A1* | 11/2002 | Goto ................... G03B 21/625 |
| | | 359/456 |
| 2004/0212012 A1* | 10/2004 | Yamazaki .......... H01L 27/1266 |
| | | 257/347 |
| 2009/0309489 A1* | 12/2009 | Takata ................. H01L 51/524 |
| | | 313/504 |
| 2014/0306201 A1* | 10/2014 | Yamazaki .......... H01L 27/3246 |
| | | 257/40 |

(Continued)

FOREIGN PATENT DOCUMENTS

| JP | 11-231329 A | 8/1999 |
| JP | 2012-190087 A | 10/2012 |

(Continued)

OTHER PUBLICATIONS

Office action dated Jan. 5, 2021 from Japan Intellectual Property Office in a counterpart Japanese Patent Application No. 2019-236203.

*Primary Examiner* — Olga V Merkoulova
(74) *Attorney, Agent, or Firm* — The PL Law Group, PLLC

(57) ABSTRACT

A touch sensor module includes a touch sensor layer including sensing electrodes and traces extending from the sensing electrodes, an optical layer on the touch sensor layer to cover the sensing electrodes, a circuit connection structure spaced apart from the optical layer and electrically connected to the traces on an end portion of the touch senor layer, and a colored resin pattern filling a gap between the optical layer and the circuit connection structure. An optical disturbance at the gap is prevented by the colored resin pattern.

14 Claims, 7 Drawing Sheets

(56) References Cited

U.S. PATENT DOCUMENTS

| | | | | |
|---|---|---|---|---|
| 2015/0363029 A1* | 12/2015 | Hsieh | ..................... | G06F 3/044 |
| | | | | 349/12 |
| 2016/0054823 A1* | 2/2016 | Kim | ..................... | G06F 1/1643 |
| | | | | 345/173 |
| 2017/0279084 A1* | 9/2017 | Sakamoto | ........... | H01L 27/3279 |
| 2018/0293420 A1* | 10/2018 | Kim | ..................... | H04M 1/026 |

FOREIGN PATENT DOCUMENTS

| JP | 2012-203701 A | 10/2012 |
|---|---|---|
| JP | 2014-89456 A | 5/2014 |
| JP | 2017-208281 A | 11/2017 |
| KR | 10-2014-0092366 A | 7/2014 |
| KR | 10-2014-0112704 A | 9/2014 |
| KR | 10-2016-0022426 A | 3/2016 |
| KR | 10-2017-0112792 | 10/2017 |
| TW | M369502 U1 | 11/2009 |
| TW | 201546675 A | 12/2015 |
| WO | WO 2017/179310 A1 | 10/2017 |

\* cited by examiner

TOUCH SENSOR MODULE, WINDOW STACK STRUCTURE INCLUDING THE SAME AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2019-0000839 filed on Jan. 3, 2019 in the Korean Intellectual Property Office (KIPO), the entire disclosure of which is incorporated by reference herein.

BACKGROUND

1. Field

The present invention relates to a touch sensor module, a window stack structure including the same and an image display device including the same. More particularly, the present invention relates to a touch sensor including a sensing electrode and an insulation structure, a window stack structure including the same and an image display device including the same.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

The display device may further include an optical member or an optical film for enhancing an image quality such as a polarizing plate, a retardation film, etc. For example, when the optical member and the touch sensor are adjacent to each other, a stepped portion or a gap between an external circuit connected to the touch sensor and the optical member may be generated to cause an optical disturbance or degrade an image quality.

For example, Korean Patent Publication No. 2014-0092366 discloses an image display device combined with a touch screen panel including a touch sensor. However, developments for improving compatibility between the optical member and the touch sensor are still required.

SUMMARY

According to an aspect of the present invention, there is provided a touch sensor module having improved optical, electrical and mechanical properties.

According to an aspect of the present invention, there is provided a window stack structure including a touch sensor module with improved optical, electrical and mechanical properties.

According to an aspect of the present invention, there is provided an image display device including a touch sensor module with improved optical, electrical and mechanical properties.

The above aspects of the present inventive concepts will be achieved by the following features or constructions:

(1) A touch sensor module, comprising: a touch sensor layer including sensing electrodes and traces extending from the sensing electrodes; an optical layer on the touch sensor layer to cover the sensing electrodes; a circuit connection structure spaced apart from the optical layer and electrically connected to the traces on an end portion of the touch senor layer; and a colored resin pattern filling a gap between the optical layer and the circuit connection structure.

(2) The touch sensor module according to the above (1), wherein a top surface of the optical layer is higher than a top surface of the circuit connection structure.

(3) The touch sensor module according to the above (2), wherein the colored resin pattern contacts sidewalls of the optical layer and the circuit connection structure.

(4) The touch sensor module according to the above (3), wherein the colored resin pattern covers the top surface of the circuit connection structure.

(5) The touch sensor module according to the above (4), wherein the colored resin pattern does not cover the top surface of the optical layer.

(6) The touch sensor module according to the above (1), wherein the touch sensor layer includes a bonding region defined by a space from which a portion of the optical layer on end portions of the traces is removed, wherein the circuit connection structure is electrically connected to the end portions of the traces on the bonding region.

(7) The touch sensor module according to the above (6), wherein the gap is formed by a remaining portion of the bonding region except for a region on which the circuit connection structure is disposed in a plan view.

(8) The touch sensor module according to the above (1), wherein the optical layer includes at least one of a polarizer, a polarizing plate, a retardation film, a reflective sheet, a luminance enhancing film or a refractive index matching film.

(9) The touch sensor module according to the above (1), wherein the circuit connection structure includes a flexible printed circuit board (FPCB).

(10) The touch sensor module according to the above (9), further comprising a conductive intermediate structure interposed between the traces and the circuit connection structure.

(11) The touch sensor module according to the above (10), wherein a conductive intermediate structure includes an anisotropic conductive film (ACF).

(12) The touch sensor module according to the above (1), wherein the colored resin pattern includes an adhesive resin.

(13) A window stack structure, comprising: a window substrate; and the touch sensor module according to any one of the above (1) to (12) on the window substrate.

(14) An image display device, comprising: a display panel; and the touch sensor module according to any one of the above (1) to (12) on the display panel.

(15) The image display device according to the above (14), further comprising a main board disposed below the touch sensor module, wherein the circuit connection structure of the touch sensor module is bent to be electrically connected to the main board.

According to exemplary embodiments as described above, the touch sensor module may include an optical layer covering a display region of a touch sensor layer, and a circuit connection structure disposed on a bonding region of the touch sensor layer. A colored resin pattern may be formed to fill a gap between the optical layer and the circuit connection structure to prevent degradation of image and optical properties caused by light leakage or light reflectance through the gap.

Further, traces included in the touch sensor layer may be protected by the colored resin pattern to improve electrical reliability. The colored resin pattern may also serve as a supporting layer or an adhesion layer so that circuit connection reliability at the bonding region may be improved.

DETAILED DESCRIPTION

According to exemplary embodiments of the present invention, there is provided a touch sensor module which may include a touch sensor layer, an optical layer and a circuit connection structure on the touch sensor layer, and a colored resin pattern between the optical layer and the circuit connection structure.

A window stack structure and an image display device including the touch sensor having improved optical, mechanical and electrical stability are also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying figures, two directions crossing each other to be, e.g., perpendicular to each other and being parallel to a top surface of a protective film or a touch sensor layer are defined as a first direction and a second direction. For example, the first direction may correspond to a length direction of the touch sensor module, and the second direction may correspond to a width direction of the touch sensor module. Further, a direction vertical to the first and second directions is defined as a third direction. For example, the third direction may correspond to a thickness direction of the touch sensor module.

Figure 1:
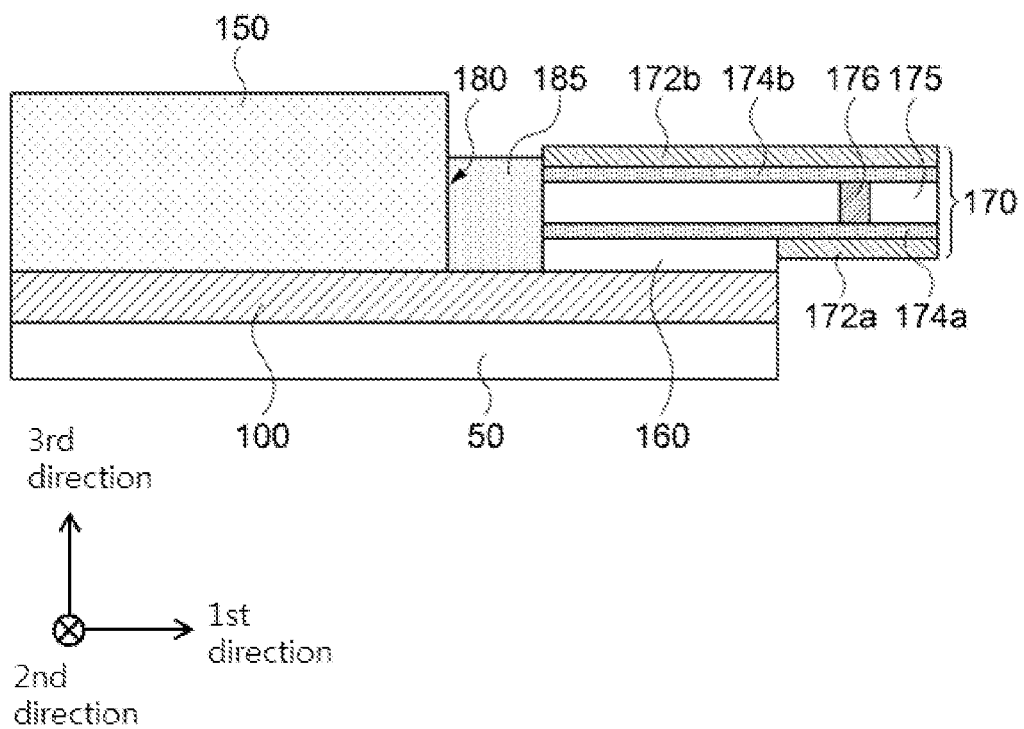
FIG. 1 is a schematic cross-sectional view illustrating a touch sensor module in accordance with exemplary embodiments.
Figure 2:
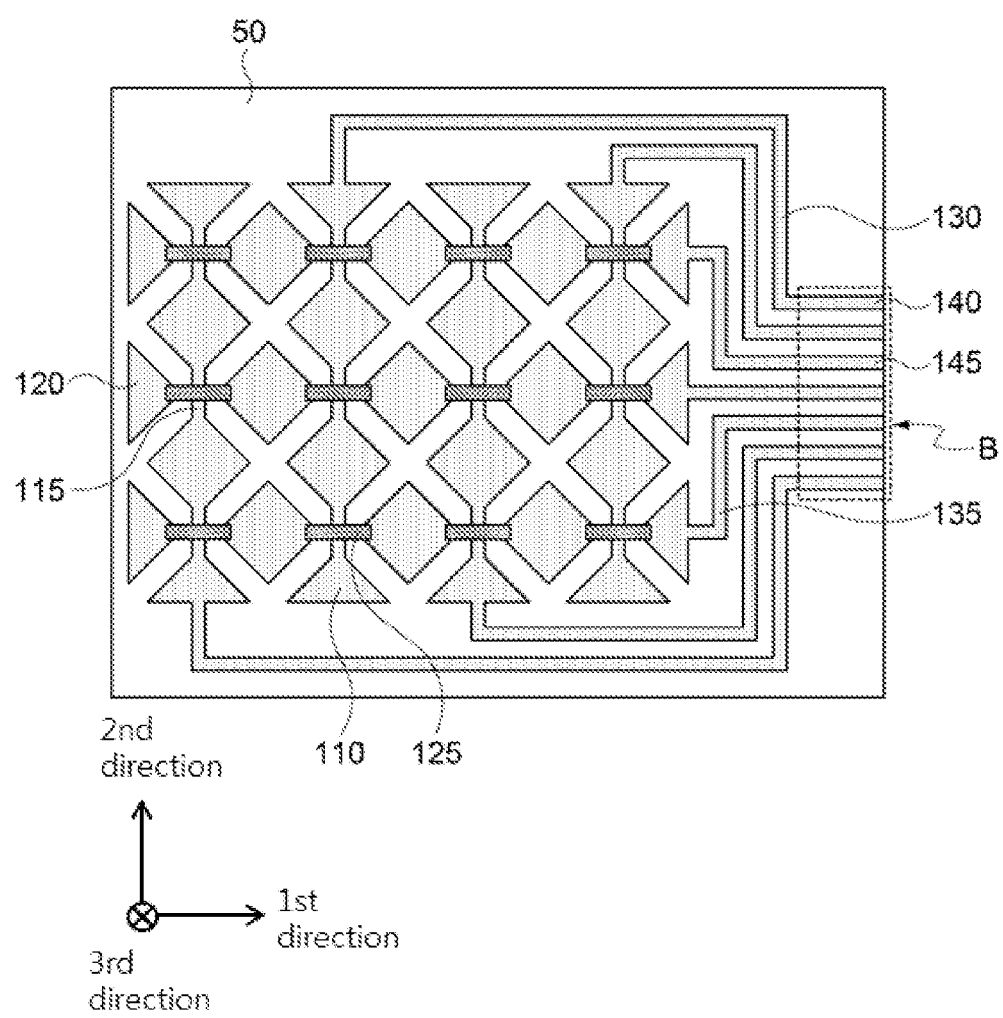
FIGS. 2 and 3 are top planar views illustrating a touch sensor module in accordance with exemplary embodiments.
Figure 3:
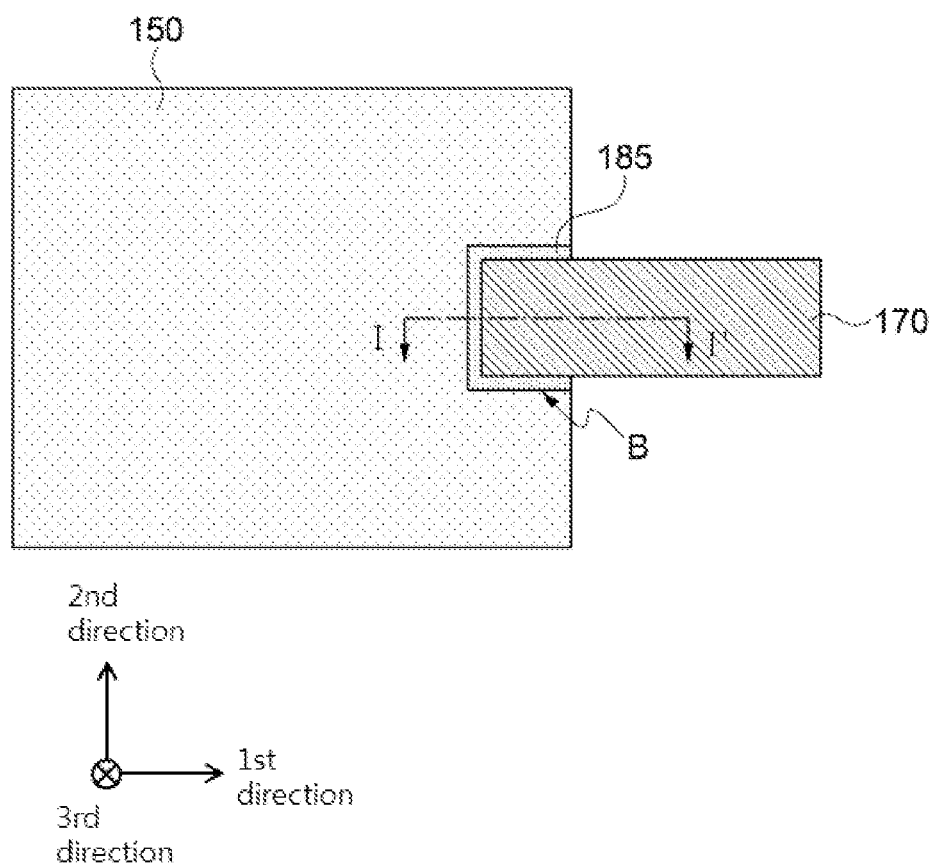

FIG. 1 is a schematic cross-sectional view illustrating a touch sensor module in accordance with exemplary embodiments. FIGS. 2 and 3 are top planar views illustrating a touch sensor module in accordance with exemplary embodiments.

Specifically, FIG. 2 is a top planar view illustration an electrode construction included in a touch sensor layer. For convenience of descriptions, an optical layer, a circuit connection structure and a colored resin pattern are omitted in FIG. 2. FIG. 3 is a top planar view illustrating a construction when the optical layer, the circuit connection structure and the colored resin pattern are added in FIG. 2. FIG. 1 is a cross-sectional view taken along a line I-I' of FIG. 3 in a thickness direction.

Referring to FIGS. 1 to 3, the touch sensor module may include a touch sensor layer 100, a circuit connection structure 170 connected to an end portion of the touch sensor layer 100, an optical layer 150 spaced apart from the circuit connection structure 170 on the touch sensor layer 100, and a colored resin pattern 185 formed between the circuit connection structure 170 and the optical layer 150.

In some embodiments, the touch sensor layer 100 may be disposed on a protective film 50. The protective film 50 may include, e.g., an inorganic insulation film and/or an organic insulation film. For example, a polymer film including, e.g., cyclo olefin polymer (COP), polyethylene terephthalate (PET), polyacrylate (PAR), polyether imide (PEI), polyethylene naphthalate (PEN), polyphenylene sulfide (PPS), polyallylate (polyallylate), polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc., may be used as the protective film 50.

In an embodiment, the protective film 50 may serve as a substrate or a base layer for forming the touch sensor layer 100. In an embodiment, the protective film 50 may be formed to protect sensing electrodes, traces, etc., during a fabrication process of the touch sensor layer 100, and may be removed after the fabrication process.

As illustrated in FIG. 2, the touch sensor layer 100 may include sensing electrodes 110 and 120, and traces 130 and 135. In exemplary embodiments, the sensing electrodes 110 and 120 may be arranged to implement a mutual capacitance type operation.

An active region of the touch sensor layer 100 from which a touch sensing may be substantially implemented may be defined by a region at which the sensing electrodes 110 and 120 are arranged. The active region may substantially correspond to a display region on which an image may be displayed in an image display device.

In exemplary embodiments, the sensing electrodes 110 and 120 may include first sensing electrodes 110 and second sensing electrodes 120.

The first sensing electrodes 110 may be arranged along, e.g., the second direction (e.g., the width direction). Accordingly, a first sensing electrode row extending in the second direction may be defined by a plurality of the first sensing electrodes 110. Further, a plurality of the first sensing electrode rows may be arranged along the first direction.

In some embodiments, the first sensing electrodes 110 neighboring in the second direction may be physically and electrically connected to each other by a connecting portion 115. For example, the connecting portion 115 may be integral with the first sensing electrodes 110 at the same level to be substantially unitary member with the first sensing electrodes 110.

The second sensing electrodes 120 may be arranged along the first direction (e.g., the length direction). In some embodiments, the second sensing electrodes 120 may each by an island-type unit electrode and may be physically spaced apart from each other. In this case, the second sensing electrodes 120 neighboring in the first direction may be electrically connected to each other by a bridge electrode 125.

A plurality of the second sensing electrodes 120 may be arranged along the first direction while being connected by the bridge electrodes 125 so that a second sensing electrode column extending in the first direction may be formed. A plurality of the second sensing electrode columns may be arranged along the second direction.

The sensing electrodes 110 and 120 and/or the bridge electrode 125 may include a metal, an alloy or a transparent conductive oxide.

For example, the sensing electrodes 110 and 120 and/or the bridge electrode 125 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), or an alloy thereof (e.g., silver-palladium-copper (APC)). These may be used alone or in a combination thereof.

The sensing electrodes 110 and 120 and/or the bridge electrode 125 may include the transparent conductive oxide such as indium tin oxide (ITO), indium zinc oxide (IZO), zinc oxide (ZnOx), indium zinc tin oxide (IZTO), cadmium tin oxide (CTO), etc.

In some embodiments, the sensing electrodes 110 and 120 and/or the bridge electrode 125 may include a multi-layered structure of the transparent conductive oxide and the metal. For example, the sensing electrodes 110, 120 and/or the bridge electrode 125 may include a triple-layered structure of a transparent conductive oxide layer-metal layer-transparent conductive oxide layer. In this case, flexible property may be improved by the metal layer, and resistance may be reduced to improve a signal transfer speed. Further, anti-corrosive and transparent properties may be enhanced by the transparent conductive oxide layer.

In some embodiments, the bridge electrode 125 may be formed on an insulation layer (not illustrated). The insulation layer may at least partially cover the connecting portion 115 included in the first sensing electrode 110, and may at least partially cover the second sensing electrodes 120 around the connecting portion 115. The bridge electrode 125 may be formed through the insulation layer, and may be electrically connected to the second sensing electrodes 120 neighboring each other with respect to the connecting portion 115.

The insulation layer may include an inorganic insulation material such as silicon oxide, silicon nitride, etc., or an organic insulation material such as an acryl-based resin, a siloxane-based resin, etc.

The traces 130 and 135 may include a first trace 130 extending from each first sensing electrode row and a second trace 135 extending from each second sensing electrode column.

A bonding region B may be allocated at an end portion of the touch sensor layer 100 or the protective film 50. The traces 130 and 135 may extend from a peripheral portion of the active region and may be collected in the bonding region B.

For example, the first traces 130 may be diverged from each first sensing electrode row at both lateral portions of the touch sensor layer 100 to extend in the first direction. The first traces 130 may be bent in the second direction, and then may be bent again in the first direction to be introduced in the bonding region B.

In some embodiments, the first traces 130 may be alternately disposed at both lateral portions of the touch sensor layer 100. The first traces 130 may be distributed uniformly at both lateral portions of the touch sensor layer 100 so that, e.g., a stress generated when the touch sensor layer 100 is bent may be uniformly dispersed. Further, the first traces 130 may be alternately dispersed at both lateral portions so that an alignment margin between neighboring first traces 130 may be increased.

The second traces 135 may be diverged from each second sensing electrode column to extend in the first direction to the bonding region B.

End portions of the traces 130 and 135 may be collected in the bonding region B to serve as a connecting portion (a pad or a terminal) electrically connected to the circuit connection structure 170. A first connecting portion 140 and a second connecting portion 145 may be defined from the first trace 130 and the second trace 135 to be disposed in the bonding region B.

The traces 130 and 135 may include a conductive material substantially the same as or similar to that included in the sensing electrodes 110 and 120.

The optical layer 150 may be disposed on the touch sensor layer 100 to cover the sensing electrodes 110 and 120. In some embodiments, as illustrated in FIG. 3, the optical layer 150 may be formed on a substantially entire top surface of the touch sensor layer 100 except for the bonding region B.

For example, the optical layer 150 may be combined with the touch sensor layer 100 to cover the entire top surface of the touch sensor layer 100, and then a portion of the optical layer 150 on the bonding region B may be removed to expose the connecting portions 140 and 145 disposed in the bonding region B.

The optical layer 150 may include a film or a layer structure for enhancing an image quality which is commonly known in the related art. Non-limiting examples of the optical layer 150 may include a polarizing plate, a polarizer, a retardation film, a reflective sheet, a luminance enhancing film, a refractive index matching film, etc. These may be used alone or in a combination thereof. In some embodiments, the optical layer 150 may include the polarizing plate.

The circuit connection structure 170 may be electrically connected to the connecting portions 140 and 145 of the touch sensor layer 100 via the bonding region B. In some embodiments, the connecting portions 140 and 145 formed at end portions of the traces 130 and 135, and a circuit wiring included in the circuit connection structure 170 may be electrically connected to each other by a conductive intermediate structure 160 such as an anisotropic conductive film (ACF).

The circuit connection structure 170 may include, e.g., a flexible printed circuit board (FPCB). In exemplary embodiments, the circuit connection structure 170 may include a core layer 175, and may include a lower circuit wiring 174a and an upper circuit wiring 174b formed on a lower surface and an upper surface of the core layer 175, respectively. In an embodiment, a through via may be formed through the core layer 175 to connect the lower circuit wiring 174a and the upper circuit wiring 174b to each other.

The core layer 175 may include a resin or liquid crystal polymer. The circuit wirings 174a and 174b may include a metal such as copper (Cu) or a Cu-alloy. A surface of the lower circuit wiring 174a and a surface of the upper circuit wiring 174b may be covered by a lower coverlay film 172a and an upper coverlay film 172b, respectively.

In exemplary embodiments, a portion of the lower coverlay film 172a may be removed to expose the lower circuit wiring 174a. An exposed portion of the lower circuit wiring 174a may be aligned on the conductive intermediate structure 160, and then a bonding process including a pressurizing process and/or a heating process may be performed on the circuit connection structure 170 so that the circuit connection structure 170 may be adhered to the touch sensor layer 100.

In exemplary embodiments, as illustrated in FIGS. 1 and 3, a gap 180 may be formed between the optical layer 150 and the circuit connection structure 170 for obtaining an alignment margin and preventing damages of the optical layer 150 during the bonding process.

In some embodiments, a separation space between the optical layer 150 and the circuit connection structure 170 may be defined as the gap 180. As illustrated in FIG. 3, a remaining portion of the bonding region B which may not be covered by the circuit connection structure 170 in a plan view may be defined as the gap 180.

In exemplary embodiments, the colored resin pattern 185 may be formed in the gap 180. The colored resin pattern 185 may at least partially fill the gap 180.

As illustrated in FIG. 3, the gap 180 may have a bent trench shape in a plan view, and the colored resin pattern 185 may continuously fill the gap 180 having the bent trench shape.

For example, a resin composition including a curable resin or an adhesive resin may be filled in the gap 180, and then a thermal curing process or an ultraviolet curing process may be performed to form the colored resin pattern 185. The resin composition may further include a coloring agent. The coloring agent may include a pigment and/or a dye. The resin composition may further include a solvent, a photo-curable monomer, a photo-polymerization initiator, a curing agent, etc., which may be widely used in an organic curable composition.

In an embodiment, the colored resin pattern 185 may be formed using a black ink-based composition for forming a bezel pattern, a light-shielding pattern, a pixel defining wall, etc., of an image display device.

As described above, when the optical layer 150 and the circuit connection structure 170 may be combined as a module together with the touch sensor layer 100, a spacing distance such as the gap 180 may be needed for preventing damages of the optical layer 150 and obtaining an alignment margin of the circuit connection structure 170. In this case, light leakage may be caused through the gap 180. Further, the traces 130 and 135 may be partially exposed through the gap 180, and thus an image quality may be deteriorated by a light-reflectance, and the traces 130 and 135 may be seen by a user of the image display device.

However, according to exemplary embodiments, the gap 180 may be filled with the colored resin pattern 185 so that light leakage and reflectance through the gap 180 may be prevented. Further, the colored resin pattern 185 may have an adhesive property to serve as a supporting pattern or a fixing pattern of the circuit connection structure 170.

In some embodiments, the touch sensor layer 100 may further include a passivation layer (not illustrated) covering the sensing electrodes 110 and 120 and the traces 130 and 135. The optical layer 150 may be formed on the passivation layer. A portion of the passivation layer on the bonding region B may be removed, and then the circuit connection structure 170 may be adhered to the bonding region B.

In this case, the traces 130 and 135 may be partially exposed from the passivation layer through the gap 180. However, the exposed traces 130 and 135 may be protected by the colored resin pattern 185 so that a signal transfer failure or a resistance increase due to an oxidation or damages of the traces 130 and 135 may be avoided.

Figure 4:
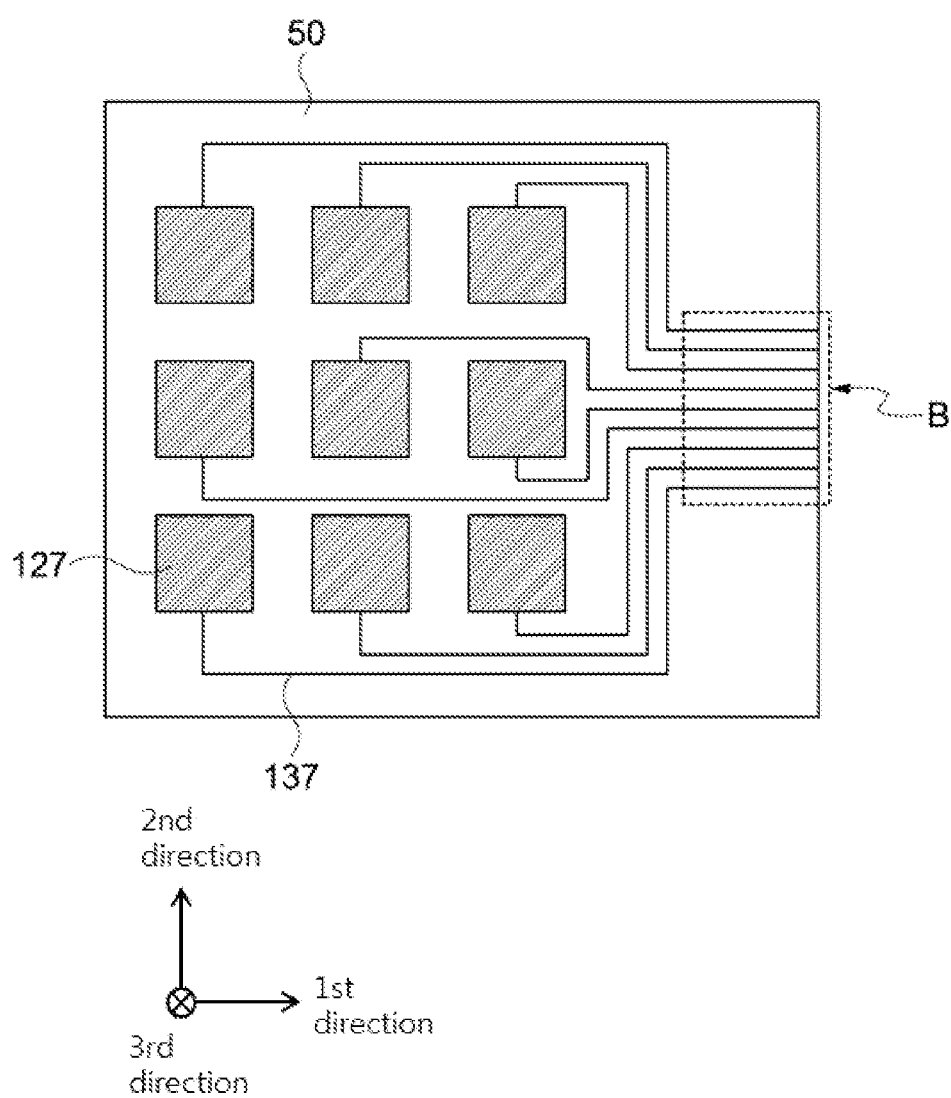
FIG. 4 is a top planar view illustrating a touch sensor layer in accordance with some exemplary embodiments.

FIG. 4 is a top planar view illustrating a touch sensor layer in accordance with some exemplary embodiments.

Referring to FIG. 4, sensing electrodes 127 and traces 137 of a touch sensor layer 100 may be arranged according to a self-capacitance operational type.

The touch sensor layer 100 may include sensing electrodes 127, each of which may have an island pattern shape and may serve as an individual sensing domain. Further, the traces 137 may be diverged from each sensing electrode 127 to extend to the bonding region B. End portions of the traces may be collected in the bonding region B to be electrically connected to the circuit connection structure 170.

Figure 5:
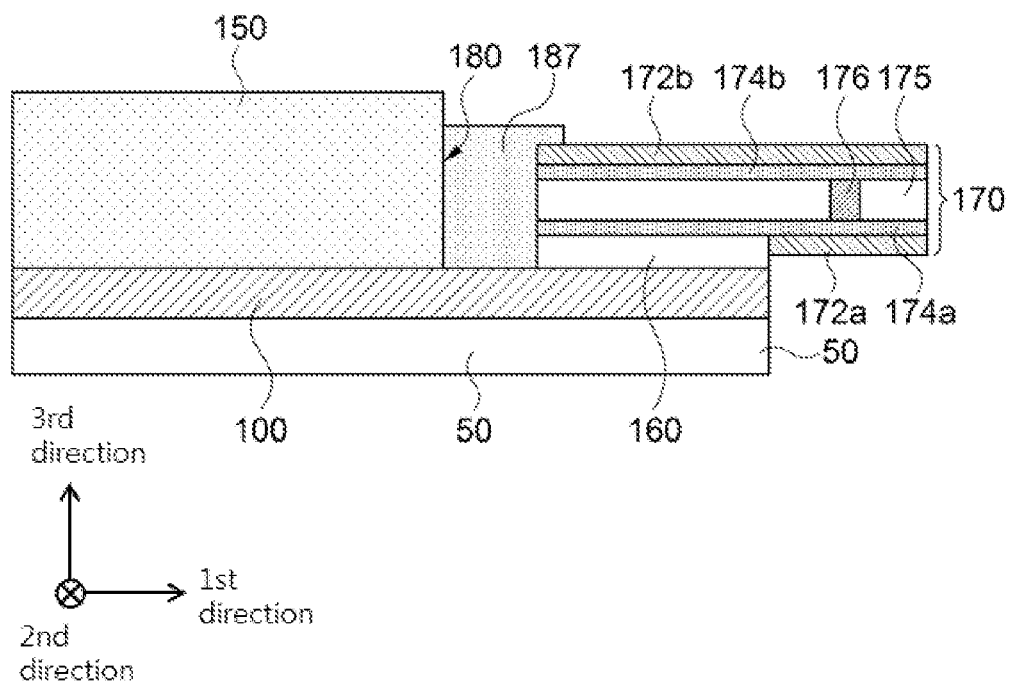
FIG. 5 is a cross-sectional view illustrating a touch sensor module in accordance with some exemplary embodiments.

FIG. 5 is a cross-sectional view illustrating a touch sensor module in accordance with some exemplary embodiments. Detailed descriptions on elements and/or structures substantially the same as or similar to those described with reference to FIGS. 1 to 3 are omitted herein.

Referring to FIG. 5, a colored resins pattern 187 may fill the gap 180 and may partially cover a top surface of the circuit connection structure 170. For example, the above-mentioned resin composition may be provided to sufficiently fill the gap 180, and then cured so that the colored resin pattern 187 may be in contact with the top surface of the circuit connection structure 170.

The colored resin pattern 187 may be in contact with top surface and a sidewall of the circuit connection structure 170 so that the circuit connection structure 170 may be fixed more stably at an end portion thereof. Thus, damages such as delamination or cracks of the circuit connection structure 170 may be effectively prevented.

As illustrated in FIGS. 1 and 5, a height of the optical layer 150 may be greater than that of the circuit connection structure 170. Accordingly, damages at a top surface of the optical layer 150 may be prevented during a bonding process of the circuit connection structure 170. In an embodiment illustrated in FIG. 5, the colored resin pattern 187 may be formed to cover the top surface of the circuit connection structure 170. The colored resin pattern 187 may be in contact with a portion of a sidewall of the optical layer 150, and may not cover the top surface of the optical layer 150. Thus, the circuit connection structure 170 may be stably supported without degrading a function of the optical layer 150.

Figure 6:
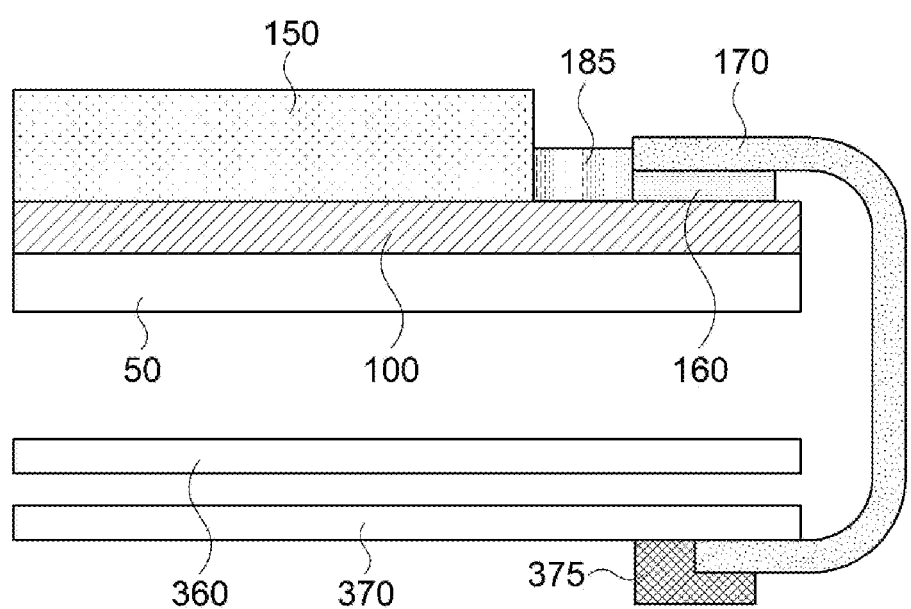
FIG. 6 is a schematic cross-sectional view illustrating an image display device combined with a touch sensor in accordance with exemplary embodiments.

FIG. 6 is a schematic cross-sectional view illustrating an image display device combined with a touch sensor in accordance with exemplary embodiments.

Referring to FIG. 6, an image display device may include a display panel 360 and a main board 370, and may include the touch sensor module according to exemplary embodiments as described above. The touch sensor module may include the touch sensor layer 100 and the optical layer 150 covering an active region or a display region of the touch sensor layer 100.

An end portion of the circuit connection structure 170 may be spaced apart from the optical layer 150 with respect to the colored resin pattern 185, and may be electrically connected to the touch sensor layer 100 via the conductive intermediate structure 160.

In exemplary embodiments, an opposite end portion of the circuit connection structure 170 may be bent below the touch sensor layer 100 and may extend in a thickness direction of the image display device. The opposite end portion of the circuit connection structure 170 may be bent again in a length direction of the image display device to be electrically connected to the main board 370. For example, the circuit connection structure 170 may be connected to a bonding pad 375 formed at a lower surface of the main board 370.

In exemplary embodiments, the colored resin pattern 185 may be formed between the optical layer 150 and the circuit connection structure 170. Thus, even though the circuit connection structure 170 may be severely bent, an expansion of the gap 180 and a delamination/separation of the circuit connection structure 170 may be avoided.

In some embodiments, the opposite end portion of the circuit connection structure 170 may be inserted between the display panel 360 and the main board 370 to be electrically connected to a circuit device disposed on a top surface of the main board 370.

Figure 7:
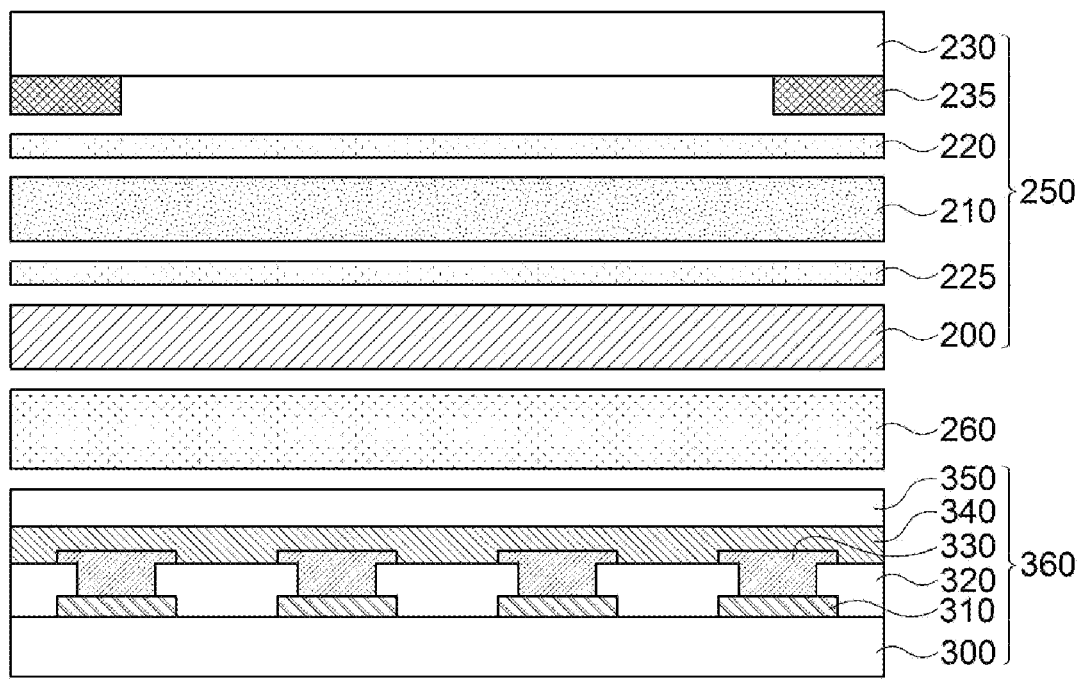
FIG. 7 is a schematic view illustrating a window stack structure and an image display device in accordance with exemplary embodiments.

FIG. 7 is a schematic view illustrating a window stack structure and an image display device in accordance with exemplary embodiments.

A window stack structure 250 may include a window substrate 230 and the touch sensor module according to exemplary embodiments as described above. The touch sensor module may include, e.g., a touch sensor layer 200 and an optical layer 210 disposed on a display region of the touch sensor layer 200. For convenience of descriptions, an illustration of the circuit connection structure 170 is omitted. The circuit connection structure may be included in the image display device as described with reference to FIG. 6.

The window substrate 230 may include, e.g., a hard coating film. In an embodiment, a light-shielding pattern 235 may be formed on a peripheral portion of a surface of the window substrate 230. The light-shielding pattern 235 may include a color-printed pattern, and may have a single-layered or multi-layered structure. A bezel portion or a non-display region of the image display device may be defined by the light-shielding pattern 235.

The optical layer 210 may include various optical films or optical structures that may be employed in the image display device as described with reference to FIGS. 1 to 3. In some embodiments, the optical layer 210 may include a coating-type polarizer or a polarizing plate. The coating-type polarizer may include a liquid crystal coating layer that may include a cross-linkable liquid crystal compound and a dichroic dye. In this case, the optical layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The optical layer 210 may be directly attached to the surface of the window substrate 230 or may be attached via a first adhesive layer 220.

The touch sensor layer 200 may be included in the window stack structure 250 as a film or a panel. In an embodiment, the touch sensor layer 200 may be combined with the optical layer 210 via a second adhesive layer 225.

As illustrated in FIG. 7, the window substrate 230, the optical layer 210 and the touch sensor layer 200 may be sequentially positioned from a viewer's side. In this case, sensing electrodes of the touch sensor layer 200 may be disposed under the optical layer 210 that may include the polarizer or the polarizing plate so that electrode patterns may be effectively prevented from being seen by the viewer.

In an embodiment, the window substrate 230, the touch sensor 200 and the optical layer 210 may be sequentially positioned from the viewer's side.

The image display device may include a display panel 360 and the window stack structure 250 including the touch sensor module according to exemplary embodiments which may be disposed on the display panel 360.

The display panel 360 may include a pixel electrode 310, a pixel defining layer 320, a display layer 330, an opposing electrode 340 and an encapsulation layer 350 disposed on a panel substrate 300.

The panel substrate 300 may include a flexible resin material, and the image display device may be provided as a flexible display.

A pixel circuit including a thin film transistor (TFT) may be formed on the panel substrate 300, and insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

EXAMPLE

A touch sensor sample (manufactured by DONGWOO FINE-CHEM) including electrode patterns and traces including ITO and having a thickness of 0.46 μm which were attached to a PET protective film having a thickness of 87 μm was prepared.

A polarizing plate including a polyvinylalcohol (PVA) having a thickness of 20 μm attached to a TAC protective film having a thickness of 86 μm was attached to the touch sensor sample. The polarizing plate was partially removed such that the traces at an end portion of the touch sensor sample were exposed to define a bonding region. A FPCB was attached to the bonding region such that a spacing distance from the polarizing plate was 0.3 mm to form a gap.

A black ink composition (product name: 9951LR, manufactured by Dymax) was filled in the gap, and an ultraviolet curing was performed to obtain a touch sensor module including a colored resin pattern.

Comparative Example 1

From the touch sensor module of Example, the colored resin pattern was omitted and the polarizer was formed to cover a remaining portion of the bonding region (a gap portion) except for a portion of the FPCB.

Comparative Example 2

A touch sensor module was fabricated by the same method as that of Example except that a transparent resin composition (product name: ECCOBOND DS 3318BK, manufactured by Loctite) was used instead of the black ink composition.

Experimental Example

Evaluation on Reflectivity and Chromaticity

Reflectivity and chromaticity (CIE color coordinate) values of each touch sensor module of Example and Comparative Examples were measured using ST-4000DLX (Minolta). Specifically, an average reflectivity at a wavelength from 400 nm to 700 nm was measured, and an average color coordinate value through an entire top surface of the touch sensor module was measured.

The results are shown in Table 1 below.

TABLE 1

|  | Reflectivity (%) | L*(D65) | a*(D65) | b*(D65) |
| --- | --- | --- | --- | --- |
| Example | 0.1 | 0.93 | 0.35 | 0.17 |
| Comparative Example 1 | 2.2 | 16.5 | 0.25 | −0.4 |
| Comparative Example 2 | 3.2 | 20.8 | −0.7 | 1.1 |

Referring to Table 1, the touch sensor module of Example including the colored resin pattern in the gap between the polarizer and the FPCB showed reduced reflectivity relatively to those of Comparative Example 1 in which the polarizer filled the gap and Comparative Example 2 in which the gap is filled with a transparent resin pattern. Further, a color sense difference at the bonding region was reduced, and thus an electrode pattern visibility and a light leakage were not caused in Example.

What is claimed is:

1. A touch sensor module, comprising:
a touch sensor layer comprising sensing electrodes and traces extending from the sensing electrodes;
an optical layer on the touch sensor layer to cover the sensing electrodes;
a circuit connection structure spaced apart from the optical layer and electrically connected to the traces on an end portion of the touch senor layer; and
a colored resin pattern filling a gap between the optical layer and the circuit connection structure;
wherein the touch sensor layer comprises an active region in which the sensing electrodes are arranged and a bonding region allocated at a peripheral end portion of the touch sensor layer, and the circuit connection structure are connected to the traces on the bonding region; and
the colored resin pattern at least partially fills a remaining portion of the bonding region except for a region on which the circuit connection structure is disposed in a planar view.

2. The touch sensor module according to claim 1, wherein a top surface of the optical layer is higher than a top surface of the circuit connection structure.

3. The touch sensor module according to claim 2, wherein the colored resin pattern contacts sidewalls of the optical layer and the circuit connection structure.

4. The touch sensor module according to claim 3, wherein the colored resin pattern covers the top surface of the circuit connection structure.

5. The touch sensor module according to claim 4, wherein the colored resin pattern does not cover the top surface of the optical layer.

6. The touch sensor module according to claim 1,
wherein the circuit connection structure is electrically connected to the end portions of the traces on the bonding region.

7. The touch sensor module according to claim 1, wherein the optical layer includes at least one of a polarizer, a polarizing plate, a retardation film, a reflective sheet, a luminance enhancing film or a refractive index matching film.

8. The touch sensor module according to claim 1, wherein the circuit connection structure includes a flexible printed circuit board (FPCB).

9. The touch sensor module according to claim 8, further comprising a conductive intermediate structure interposed between the traces and the circuit connection structure.

10. The touch sensor module according to claim 9, wherein a conductive intermediate structure includes an anisotropic conductive film (ACF).

11. The touch sensor module according to claim 1, wherein the colored resin pattern includes an adhesive resin.

12. A window stack structure, comprising:
a window substrate; and
the touch sensor module according to claim 1 on the window substrate.

13. An image display device, comprising:
a display panel; and
the touch sensor module according to claim 1 on the display panel.

14. The image display device according to claim 13, further comprising a main board disposed below the touch sensor module,
wherein the circuit connection structure of the touch sensor module is bent to be electrically connected to the main board.

* * * * *